United States Patent [19]

Harper et al.

[11] Patent Number: 5,924,356
[45] Date of Patent: Jul. 20, 1999

[54] FOOD PRODUCT BREADING MACHINE

[75] Inventors: G. Daniel Harper, Collins; Lane Bettcher; Forrest A. Airhart, both of Huron, all of Ohio

[73] Assignee: Bettcher Industries, Inc., Birmingham, Ohio

[21] Appl. No.: 09/021,654

[22] Filed: Feb. 10, 1998

[51] Int. Cl.[6] .............................. A23L 1/22; A23G 3/00; A47J 44/00; B05C 19/00

[52] U.S. Cl. ................................ 99/494; 99/352; 99/407; 99/516; 118/13; 118/18

[58] Field of Search ............................ 99/485, 494, 516, 99/352–355, 403, 407, 450.1, 450.2; 118/13, 16–18, 19, 20, 22, 24, 239, 257, 261, 423, 429, 308, 312, 621, 626; 198/715, 384, 659, 580, 613; 426/289, 292, 293, 295, 296, 94, 96, 99, 305, 519, 560, 443, 446

[56] References Cited

U.S. PATENT DOCUMENTS

| | | |
|---|---|---|
| 895,856 | 8/1908 | Harton . |
| 910,812 | 1/1909 | Harton . |
| 2,509,533 | 5/1950 | Schoen, Jr. . |
| 2,855,893 | 10/1958 | Greer et al. . |
| 3,589,274 | 6/1971 | Murray . |
| 3,735,726 | 5/1973 | Butler ........................................ 118/24 |
| 3,739,743 | 6/1973 | McKee, Jr. ............................ 99/494 X |
| 3,967,583 | 7/1976 | Booth . |
| 4,497,244 | 2/1985 | Koppens ........................... 99/450.1 X |
| 5,020,427 | 6/1991 | Kennefick et al. .................... 99/516 X |
| 5,052,330 | 10/1991 | Stacy .................................... 118/312 X |
| 5,160,377 | 11/1992 | Montemayor et al. . |
| 5,226,354 | 7/1993 | Stewart ..................................... 99/494 |
| 5,236,502 | 8/1993 | Wadell .................................. 118/13 X |
| 5,238,493 | 8/1993 | Miller .................................... 99/494 X |
| 5,284,514 | 2/1994 | Griffiths ................................ 99/494 X |
| 5,318,629 | 6/1994 | Raque et al. . |
| 5,463,938 | 11/1995 | Sarukawa et al. . |
| 5,514,399 | 5/1996 | Cordera et al. ......................... 426/295 |
| 5,643,361 | 7/1997 | Wadell .................................. 494/18 X |
| 5,664,489 | 9/1997 | Herrick, IV .............................. 99/494 |
| 5,707,448 | 1/1998 | Cordera et al. ........................ 99/494 X |

OTHER PUBLICATIONS

"SBB Batter–Breader," Bettcher Industries, Inc., Feb. 1997, 1 Sheet.

"The No Paper Continuous Hot Oil Filter," Sam Stein Assocites Inc., 1 sheet, no date.

Primary Examiner—Timothy F. Simone
Attorney, Agent, or Firm—Watts Hoffmann Fisher & Heinke

[57] ABSTRACT

A food product breading machine is disclosed that comprises a breading unit and a battering unit. The breading unit includes a breading material reservoir, a conveyor for moving food products and breading material along a travel path to a breading application station, and a breading material flow controlling system for creating a standing wave of breading material at the breading application station. The breading material flow controlling system comprises food product engaging elements movable toward and away from the conveyor to enable food products to pass through the standing wave and the application station while continuing to restrict the flow of breading material from the station. An adjustable plow projects into the breading approaching the application station to facilitate breading lateral sides of food products approaching the station. The battering unit comprises a batter reservoir and a battering unit conveyor for moving food products through the batter reservoir and delivering food products to the breading unit.

14 Claims, 5 Drawing Sheets

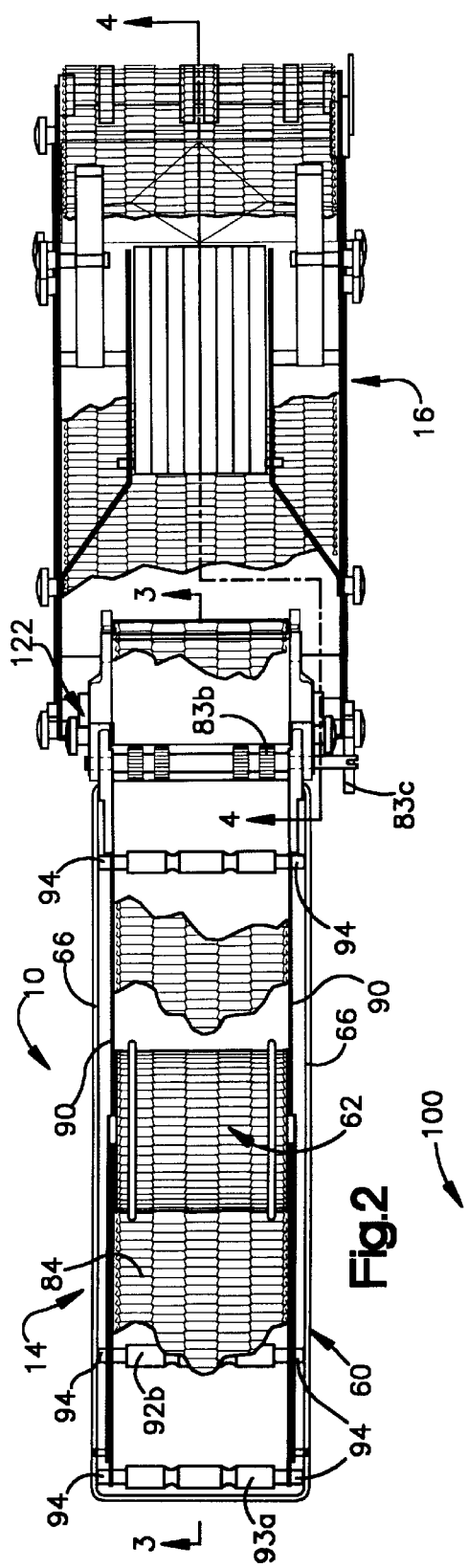
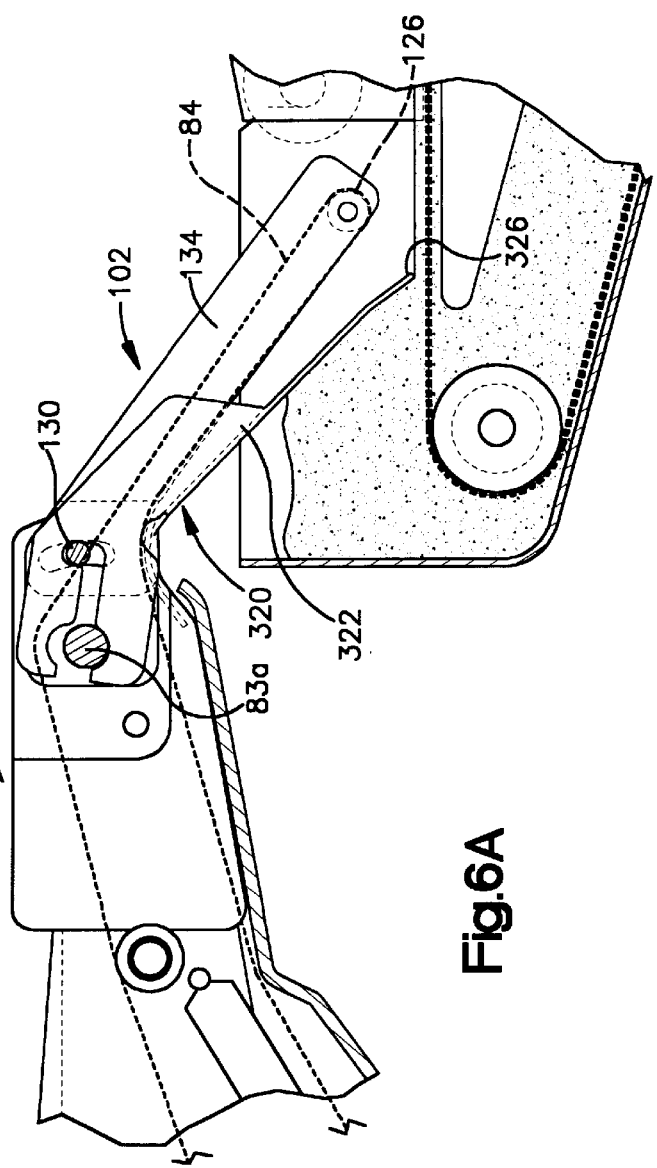

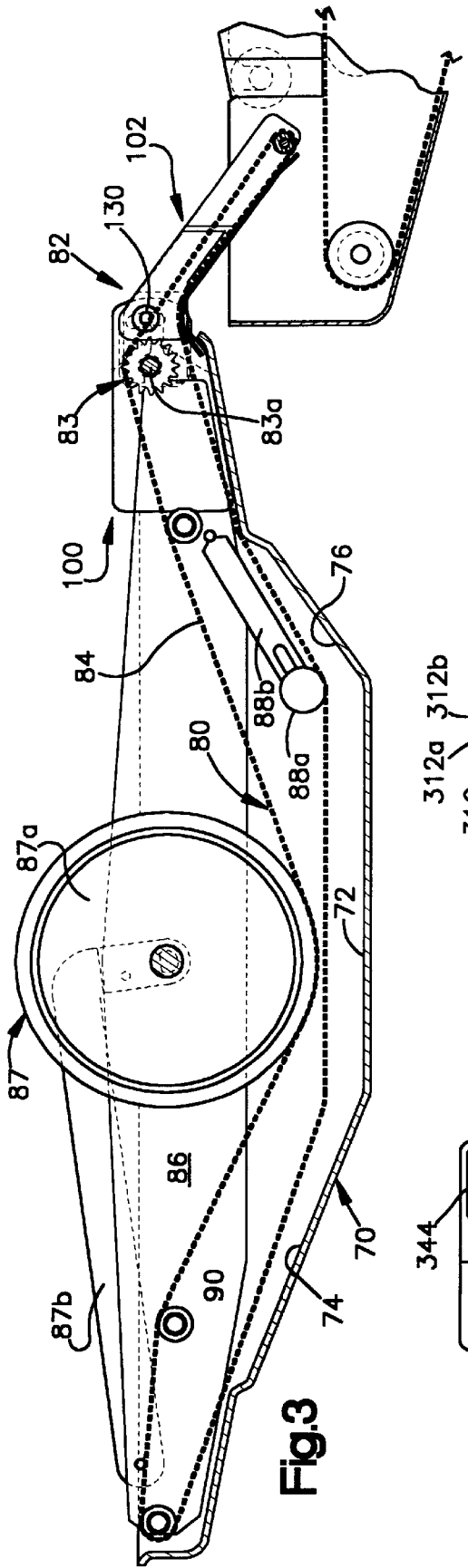
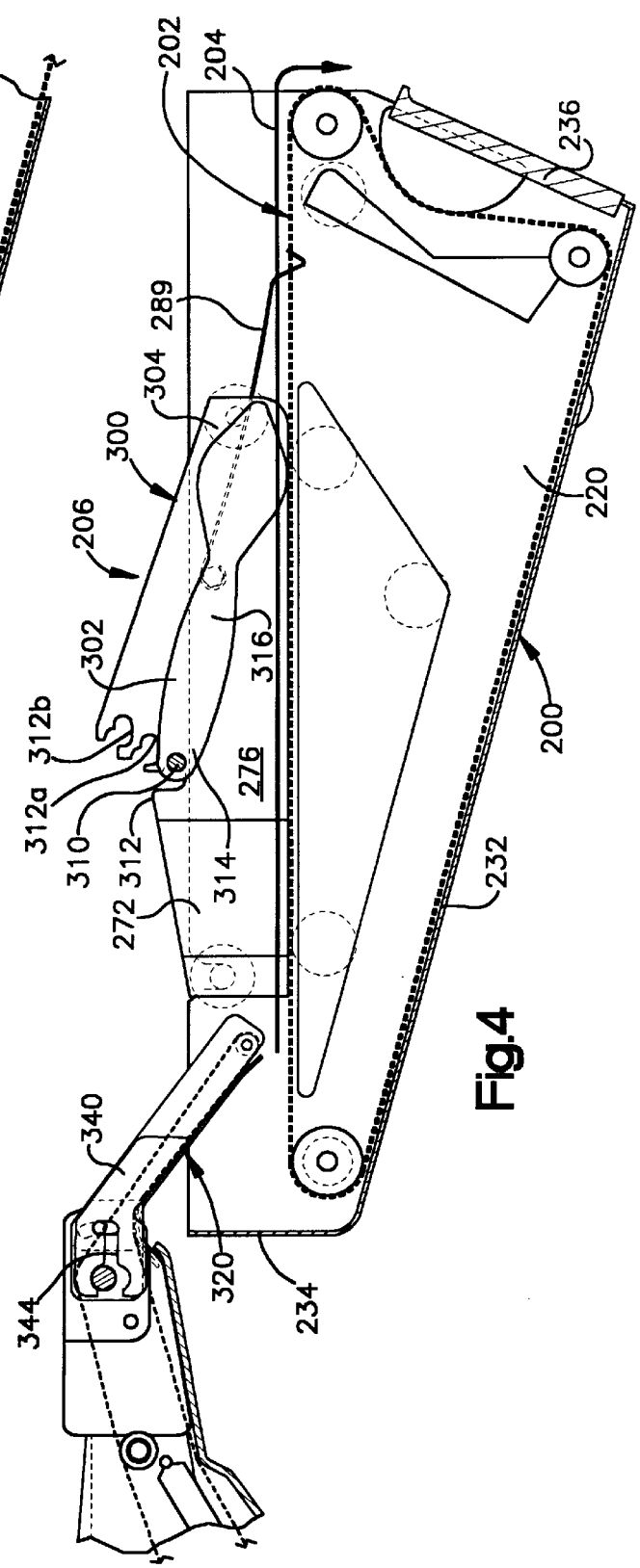

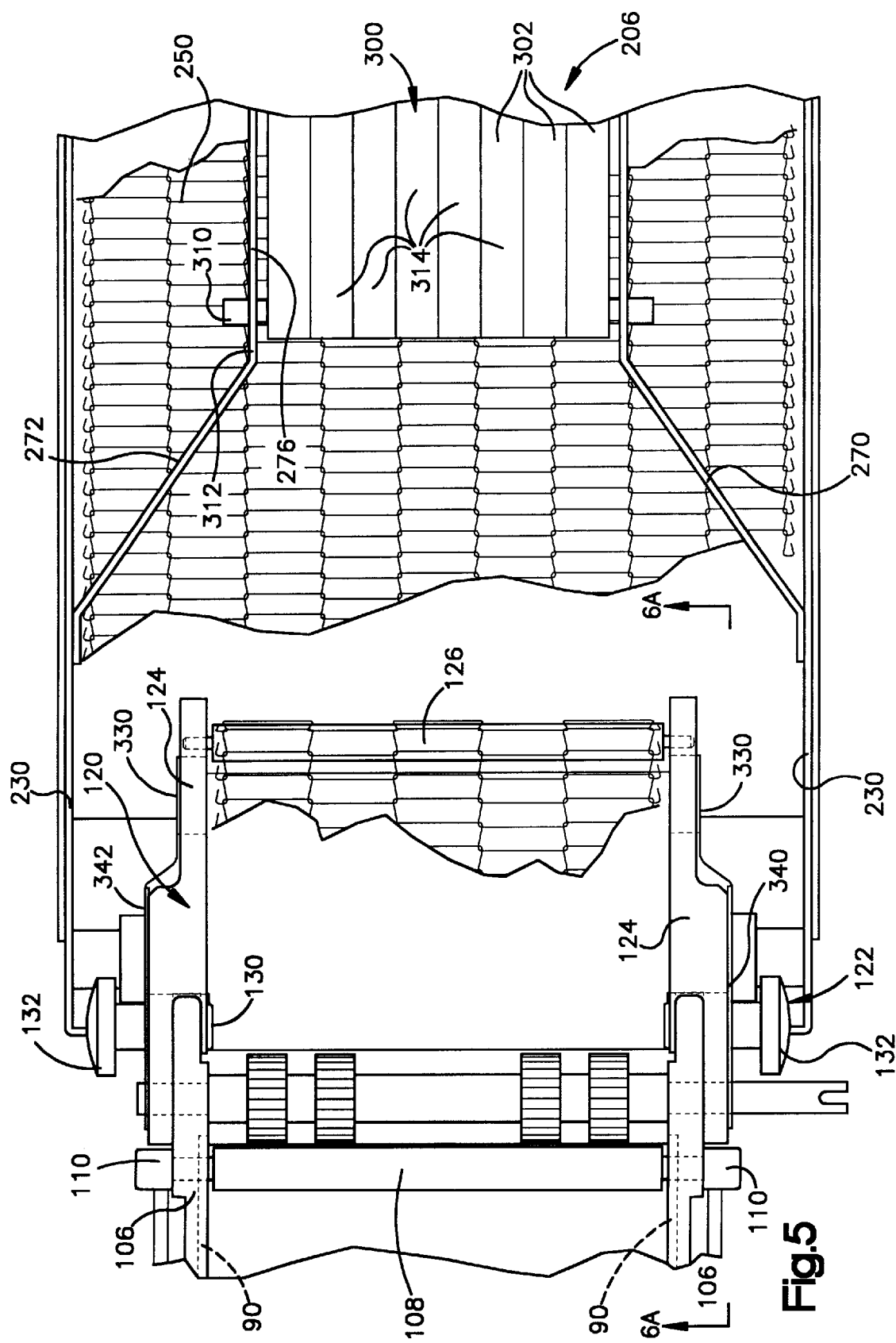

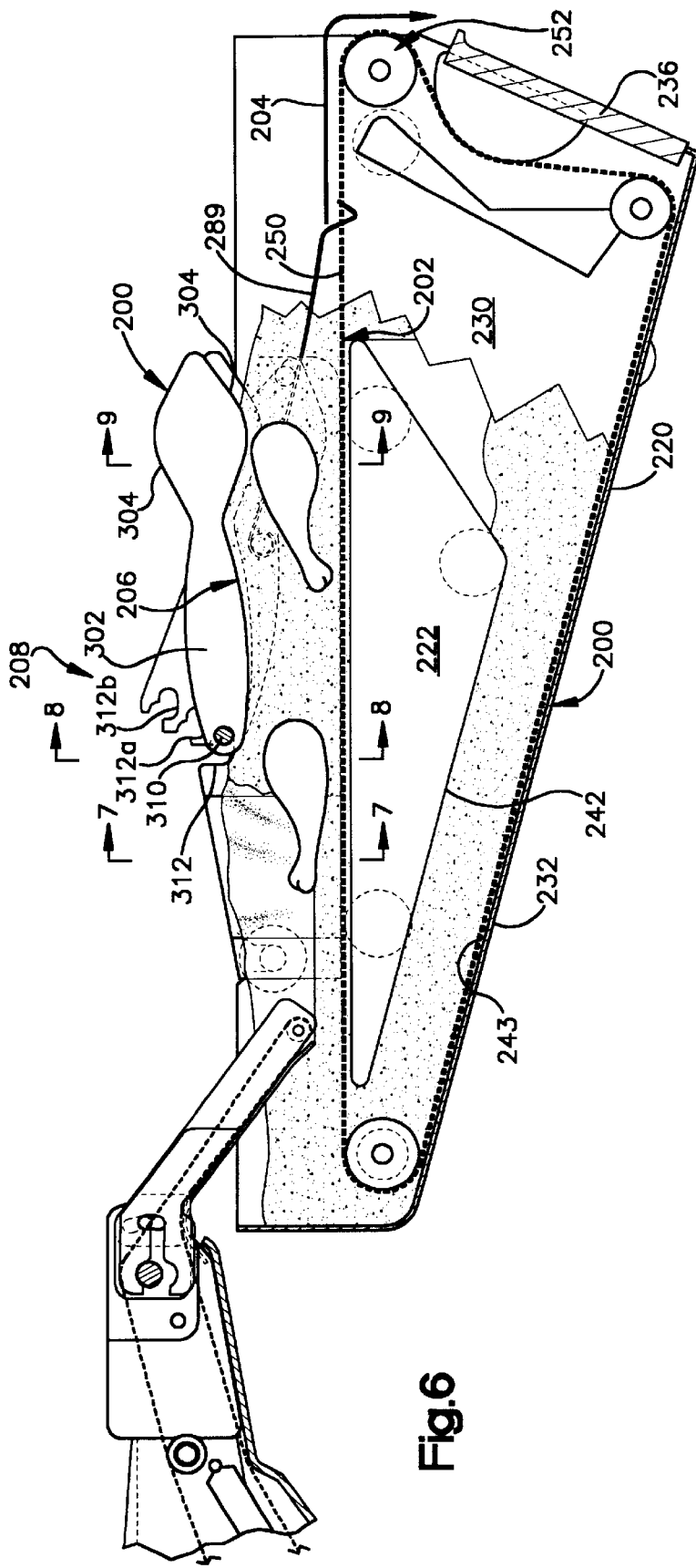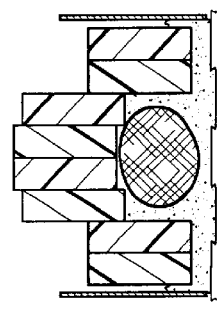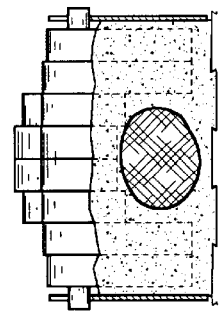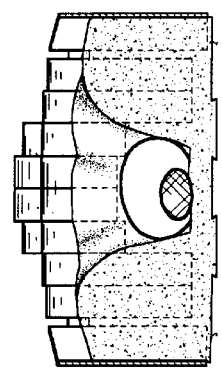

FOOD PRODUCT BREADING MACHINE

FIELD OF THE INVENTION

The present invention relates to food product breading machines and more particularly to food product breading machines for handling food products that vary significantly in size, shape, and consistency.

BACKGROUND OF THE INVENTION

Breading machines used to coat food products that vary widely in size, shape and consistency are in widespread use. A typical application is in restaurants where successions of different food products—fish filets, chicken legs and breasts, thin strips of boneless chicken flesh, onion rings, etc.—are breaded in response to orders. These machines have included a breading reservoir, a breading conveyor for moving breading material and food products through a breading application station, and a device for mounding breading material at the application station. Food items were often introduced into the breading machine by a delivery conveyor that deposited batter coated food products on the breading conveyor.

Assuring the uniform application of breading has been problematic because of the structural differences between the diverse food products. For instance, when a succession of chicken breasts, legs and other relatively large, dimensionally stable items passed through a prior art breading machine, the supply of breading material available to coat the items at the breading application station was both depleted and dampened from batter as successive items passed through the station. This resulted in items being incompletely breaded. When chicken meat strips—or other elongated, essentially flaccid items—were breaded, they were sometimes deposited in a heap on the breading conveyor. When heaped, these items passed through the breading station without being completely coated by the breading material.

The present invention provides new and improved food product breading machinery that is so constructed and arranged that breading material is accumulated and retained at a breading application station to assure that relatively large dimensionally stable food items are completely and reliably coated. The present invention also provides a new and improved food product breading machine that is so constructed and arranged that elongated, flaccid food items are delivered to the breading application station in an extended condition, and are not heaped when they pass through the breading application station.

SUMMARY OF THE INVENTION

The present invention provides an new and improved food product breading machine that includes a breading unit comprising a breading material reservoir, a conveyor for moving food products and breading material along a travel path through the breading material reservoir, a breading application station defined along the travel path, and breading material flow controlling system at the breading application station for accumulating and compressing breading material at the application station.

The breading material flow controlling system comprises a product engaging breading flow restrictor unit establishing a standing wave of breading material at the application station when food products approach the station. The restrictor unit comprises a plurality of food product engaging elements defining respective surfaces movable toward and away from the conveyor to enable breaded product to pass through the standing wave of breading material and the station while continuing to restrict the flow of breading material from the station.

The food product engaging elements also serve to compress the breading onto the food products, increasing the breading adhesion to the products.

According to a preferred embodiment of the invention the product engaging surfaces are biased toward a first position adjacent the conveyor. The surfaces are disposed adjacent each other proceeding laterally across the travel path and, in the first position, restrict the passage of breading material through the station to create the breading material standing wave. Surfaces that engage a product passing through the station are shifted away from the first position in conformity with the product shape to both compress the breading onto the product and to restrict the passage of breading carried by the product through the station.

The breading flow control system further comprises a breading diverter unit for deflecting breading material on the conveyor approaching the breading application station. The diverter unit comprises a breading plow projecting over the breading unit conveyor and into the breading material to direct breading material laterally relative to the travel path. The plow creates a furrow bounded by breading mounds that facilitate application of breading to food products at the application station. Connector structure detachably secures the plow in adjusted positions relative to the breading unit conveyor to vary the size of the breading mounds.

According to a preferred embodiment of the invention a second conveyor delivers battered food products to the reservoir. The second conveyor comprises an endless conveyor member defining an end portion projecting over the reservoir, and an end portion supporting mechanism. The reach end portion has an upper belt section for supporting product being delivered to the reservoir and a lower, return section. The reach end supporting mechanism comprises a reach end support member and a positioner member for adjustably fixing the reach end supporting member position, and the reach end portion position, relative to the breading conveyor. The second conveyor position is adjusted so that it is adjacent the breading conveyor for delivering elongated, flaccid products to the breading conveyor in extended conditions.

Another feature resides in the assembly of the breading diverter to the second conveyor so that the plow extends along the lower reach return section to a projecting end disposed adjacent the breading conveyor, a plow positioner for shifting the plow toward and away from the return section.

Further features and advantages of the invention will become apparent from the following detailed description of a preferred embodiment made in reference to the accompanying drawings.

BRIEF DESCRIPTION OF THE DRAWINGS

FIG. 2 is a top plan view of the machine of FIG. 1 seen approximately from the plane indicated by the line 2—2 of FIG. 1, with parts removed and parts broken away;

FIG. 3 is a cross sectional view seen approximately from the plane indicated by the line 3—3 of FIG. 2;

FIG. 4 is a cross sectional view seen approximately from the plane indicated by the line 4—4 of FIG. 2;

FIG. 5 is an enlarged view of part of FIG. 2 with parts broken away;

FIG. 6 is an enlarged cross sectional view of part of FIG. 1 with parts removed and parts broken away;

FIG. 6A is a cross-sectional view seen approximately from the plane indicated by the line 6A—6A of FIG. 5;

FIG. 7 is a cross sectional view seen approximately from the plane indicated by the line 7—7 of FIG. 6;

FIG. 8 is a cross sectional view seen approximately from the plane indicated by the line 8—8 of FIG. 6; and, FIG. 9 is a cross sectional view seen approximately from the plane indicated by the line 9—9 of FIG. 6.

DESCRIPTION OF THE BEST MODE CONTEMPLATED OF CARRYING OUT THE INVENTION

Figure 1:
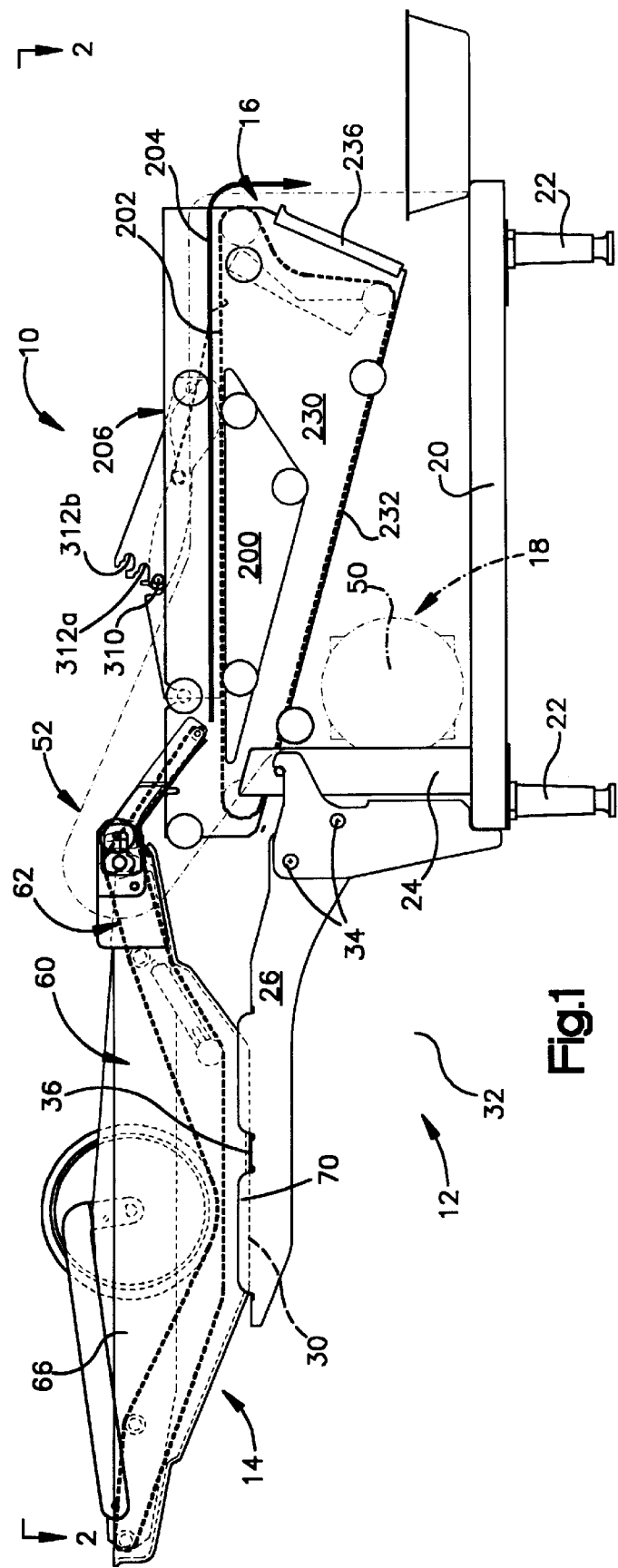
FIG. 1 is an elevation view of a food product breading machine constructed according to the invention with parts removed and parts schematically shown.

A food product breading machine 10 constructed according to the invention is illustrated in the drawings. The machine 10 is especially useful in restaurant settings where individual food products, such as chicken parts, cut vegetables, fish filets, etc., are fried to order. The machine 10 coats individual food items with a fluent batter and then overcoats them with a particulate breading material that clings to the batter. The breaded items are discharged from the machine in condition for frying. Referring in particular to FIGS. 1 and 2, the machine 10 comprises a supporting framework 12, a battering unit 14, a breading unit 16, and a drive system 18.

The framework 12 is preferably constructed and arranged so that the battering and breading units are detachably supported and easily removable for cleaning without requiring the use of tools. In the illustrated embodiment, the framework 12 comprises a base plate 20, support legs 22, stanchions 24 projecting upwardly from the base plate, a battering unit support structure 26, and a breading unit support structure 28. The legs 22 are sized so that the machine 10 may be placed on a table top or counter during use.

The battering unit support structure 26 projects from one end of the framework 12 and carries a battering unit seat 30 near its projecting end. The illustrated support structure 26 is formed by spaced side plates 32 that are rigidly connected together by cross bars 34. The side plates 32 are anchored between the stanchions 24 and supported on the base plate 20 so that the structure 26 projects, cantilever fashion, from the base plate. The battering unit seat 30 is preferably formed by a plate 36 defining a flat supporting surface bounded by an up-turned peripheral flange. The support surface extends laterally between the side plates 32 near their projecting ends. The battering unit rests on the plate 36 so that it may be lifted onto and off of the machine.

The breading unit support structure 28 provides a seat for the breading unit and comprises sheet metal side walls (shown schematically) respectively supported by the base plate on opposite lateral sides of the breading unit. The side walls are rigidly attached together to receive and support the breading unit so that it may be lifted to and from the machine.

The drive system 18 is constructed and arranged to drive food product conveyors associated with the battering and breading units so that food products may move substantially continuously through the machine 10. The illustrated drive system 18 comprises a drive motor 50 and a drive transmission 52 between the motor and the conveyors. The motor 50 is preferably an electric motor that is anchored between the stanchions 24. The drive transmission 52 is preferably a chain drive (not illustrated) and a chain guard structure (schematically shown in FIG. 1).

The illustrated battering unit 14 receives food items placed in it by an attendant, completely immerses the items in a batter pool, enables excess batter to be shed from the items and delivers the battered items to the breading unit. The battering unit 14 comprises a batter reservoir 60 and a battering unit conveyor 62. The battering unit conveyor 62 is supported by the batter reservoir 60 and operated by the drive system 18 to move food products through the batter reservoir and deliver them to the breading unit.

The batter reservoir 60 is illustrated in the form of an open top tank having straight lateral side walls 66 and a base 70 extending between the opposite tank ends. Referring to FIGS. 2 and 3, the base 70 comprises a trough-like depressed central section 72, where batter in the reservoir pools, entrance and discharge sections 74, 76 at respective opposite central section ends that direct batter dropped from the conveyor back to the central section, and seating structure 80 coacting with the battering unit seat 30 to assure the reservoir stability during use.

The entrance section 74 is defined by an end lip that merges into a wall that gently slopes to the central section 72. The discharge section 76 is formed by a shallow lip that merges into a wall that gently slopes toward the central section. Batter that drops to the sloped entrance and discharge section walls flows back into the batter pool. The illustrated seating structure 80 is formed by a flat surface extending across the base 70 that conforms to the shape of the support surface of the plate 36 so that the reservoir nests on the seat 30. The preferred batter reservoir 60 is formed from molded plastic or stainless sheet steel.

The battering conveyor 62 occupies the reservoir 60 so that food items placed in the reservoir at the reservoir entrance end move through the batter pool, through and from the reservoir discharge end and into the breading unit. The illustrated conveyor 62 comprises a food product battering section 80, a product delivery conveyor section 82 projecting to the breading unit, and a conveyor driving assembly 83 coupling the chain drive 52 to the conveyor sections 80, 82. In the preferred embodiment the sections 80, 82 share a common conveyor "belt" 84. The belt supports the food items over minimal contact areas to maximize contact between food products and the batter while minimizing the amount of batter remaining on the conveyor belt after passing through the pool.

The preferred belt 84 is fabricated from linked metal wires forming a wide mesh, screen-like chain that extends substantially across the lateral width of the reservoir. The illustrated driving assembly 83 comprises a drive shaft 83a that extends laterally across the conveyor at the juncture of the sections 80, 82. The shaft carries belt driving sprocket wheels 83b spaced apart between the sides of the battering conveyor and an input sprocket wheel 83c engaged by the drive chain 52.

The battering section 80 extends between the reservoir entrance and discharge and comprises a belt supporting frame assembly 86, and conveyor belt controlling assemblies 87, 88. The supporting frame assembly 86 comprises side plates 90 spaced laterally apart with each extending adjacent a respective reservoir side wall 66, and cross rods 92a–c that extend between the side plates 90 for rigidifying the conveyor frame and supporting the upper reach of the conveyor belt in the section 80.

The side plates 90 are formed from sheet stainless steel and rest on the reservoir entrance and discharge section walls so that the frame assembly bridges the batter pool. The cross rods 92a–c are aligned with side frame holes and are secured in place by thumbscrews 94 that are received by the rods. The thumbscrew heads are knurled and clamped against the laterally outer surface of the associated side frame. The belt 84 is reeved around the rods 92 so that when the belt is moved by the driving assembly 83 it slides over the rods 92. The rods 92 are preferably smooth and formed from a material that bears on the belt with a low coefficient of sliding friction. The rods rub on the belt wires as the belt moves over them and remove excess batter that may be clinging to the wires. The batter thus removed drips back into the reservoir.

The belt controlling assemblies 87, 88 maintain tension in the upper and lower conveyor belt reaches, respectively. The assembly 87 directs the upper belt reach deeply into and through the batter pool and forces food items on the upper reach into the batter pool as well. The assembly 87 comprises a squirrel cage roller 87a that rides on the upper conveyor belt reach in vertical alignment with the batter pool and articulating arms 87b that support the roller 87a for rotation and for motion toward and away from the batter pool as food items pass. The roller 87a is constructed from metal screen material (like the conveyor belt 84) that is wrapped around a pair of plastic hub-forming discs carried on a fixed central axle and surrounded by a pair of lightly stretched resilient O-rings. The hub discs rotate freely on the axle. Each articulating arm 87b is pivoted to a respective side frame 90 and extends to a connection with the roller axle. The arms 87b shift about their pivot axis at the side frames 90 to permit the axle to shift the roller 87a toward and away from the batter pool depending on the contents of the conveyor belt 84.

The belt controlling assembly 88 maintains tension in the lower conveyor belt reach. The preferred embodiment comprises a smooth heavy bar 88a that is pivoted to the side frames 90 by articulating arms 88b. The weight of the bar 88a exerted on the belt tensions the belt at a desired level.

The conveyor delivery section 82 is detachably connected to, and projects from, the battering section 80 for delivering battered food items to the breading unit in a controlled manner. The preferred delivery section comprises a bearing assembly 100 and a delivery conveyor end section 102 projecting from the bearing assembly 100. The end section 102 cooperates with the bearing assembly such that the projecting conveyor end is adjustably positionable vertically relative to the breading unit.

The bearing assembly 100 supports the drive shaft 83a as well as the conveyor end section 102 (See FIGS. 3, 5 and 6A). The end section comprises laterally spaced bearing plates 106, and a cross rod 108 that extends laterally between the bearing plates and is secured in place to the plates 106 and to the plates 90. In the illustrated embodiment, one plate 106 and one plate 90 are clamped together and against each end of the cross rod 108 by a thumbscrew 110 that extends through holes in the plates and into tapped holes in the cross rod. The cross rod and thumbscrews serve to strengthen and rigidify the bearing assembly 100 as well as to detachably secure the bearing assembly 100 to the side plates 90. The drive shaft 83a extends through aligned holes in the bearing plates 106 and rotates relatively freely in the plates as the belt 84 is driven.

The delivery conveyor end section 102 comprises upper and lower conveyor belt reaches, a support unit 120, and connector structure 122 detachably securing the support unit 120 in adjusted positions relative to the breading unit. The support unit 120 comprises side support members 124 each extending along an outer face of—and projecting from—a respective bearing member, and a conveyor belt training roll 126 that defines the end of the conveyor reach. The members 124 define aligned openings through which the drive shaft 83a extends. The drive shaft is loosely received in the openings so that the members 124 are pivotally movable about the drive shaft axis relative to the bearing plates 106. The projecting ends of the members 124 define aligned holes that receive respective opposite ends of the belt training roll 126.

The conveyor belt 84 is reaved around the roll 126. The roll 126 is supported by the support members 124 relatively loosely and has a smooth external surface. As the belt rounds the roll 126 the roll may be rotated by the belt or the belt may slip with respect to the roll. The roll is easily rotatable in the projecting members 124 and the belt slides easily on the roll due to the low friction contact between the belt and roll.

The preferred and illustrated connector structure 122 enables the machine attendant to manually reposition the end section 102 to accommodate different food products. The illustrated connector structure 122 clamps the support members 124 and their associated bearing plates 106 together to fix the members 124 in adjusted positions. The illustrated connector structure comprises flat headed screws 130—each extending laterally outwardly through the respective associated bearing plate 106 and support member 124—and knobs 132. The screws 130 are loosely received by drilled holes in the bearing plates 106. The screws extend loosely through semicircular slots respectively formed in the support members 124. The slots have their center of curvature located on the drive shaft axis so that the support members 124 rotate, to a degree limited by the slot length, about the shaft 83a. Each knob is threaded onto a respective screw 130 so that the attendant tightens the knobs to clamp the support members 124 in adjusted positions.

The conveyor end section 102 is adjusted depending on the kind of food product that is delivered into the breading unit. When thin strips of uncooked chicken meat, and similar essentially flaccid elongated food products, are to be breaded, the end section 102 is adjusted so that the projecting end is deflected downwardly to a location adjacent the surface of the breading material in the breading unit. This positioning assures that the strips are not dropped into the breading—possibly forming clumps that are not completely breaded—but are fed into the breading so that they tend to be, or remain, straightened or elongated. When relatively larger, dimensionally stable items—chicken breasts and legs, for example—are handled by the conveyor, the end section 102 may be raised away from the breading material. Items dropping from the conveyor impact the breading material and are partially buried to facilitate breading coverage.

The breading unit 16 establishes a steady wave of breading material that engulfs passing food items and packs the breading against the items to completely bread the items. Referring now to FIGS. 4–9, the breading unit comprises a breading material reservoir 200, a conveyor 202 for moving food products and breading material along a travel path 204 through the breading material reservoir, a breading application station 206, and a breading material flow controlling system 208 for producing a standing wave of breading material over the conveyor at the breading application station so that food products conveyed through the station 206 pass through the standing wave of breading material.

The reservoir 200 is constructed and arranged so that breading material that is not applied to food items passing through the station 206 is recirculated through the reservoir by the conveyor. The reservoir 200 comprises a breading pan, or hopper, 220, and a core 222 (See FIG. 6) disposed within the hopper 220 for establishing a breading material recirculation path.

The illustrated hopper 220 is an open top box-like construction defining parallel vertical side walls 230, a shallow sloped base 232, a vertical end wall 234 beneath the battering conveyor end section 102, and a steeply sloped opposite end all 236 over which breaded food items are delivered from the breading unit. The preferred hopper 220 is constructed from sheet stainless steel. The hopper is detachably secured to the framework 12 by suitable manually operated knobs so that the hopper is removable from the framework without using tools.

The core 222 (FIG. 6) supports the breading material moving along the travel path 204 and confines breading material in the bottom of the hopper 220 to a space adjacent the hopper base 232. The core 222 has a generally triangular cross sectional shape and extends between the side walls 230 completely across the hopper 220. The core defines a breading supporting surface 240 extending substantially throughout the travel path 204, and a breading guide wall 242. The guide wall 242 extends parallel to the hopper base 232 and defines, with the base 232, a passage 243 through which the breading moves up to the travel path 204. The height of the passage 243 is selected so that the passage does not restrict the amount of breading that can be delivered to the travel path. The preferred core 222 is a hermetic can-like construction made from welded sheet stainless steel that is detachably secured in the hopper by hand knobs.

The conveyor 202 propels the food items and breading material along the travel path 204 and recirculates the breading material through the reservoir 200. The illustrated and preferred conveyor 202 comprises a conveyor belt 250, a conveyor drive assembly 252, belt supporting shafts 254, and a tensioning unit 256. The belt 250 is constructed from wire links, the same as the belt 84, that extend fully across the breading unit width. The belt construction is such that when it moves through the particulate breading material in the passage 243 and on the travel path 204, the breading material is effectively fluidized and swept along with the belt in a manner that emulates fluid flow. Thus, even though the breading can not be supported on the open mesh wire belt, it is readily recirculated in the breading unit by the belt motion.

The drive assembly controls the belt motion. The illustrated and preferred drive assembly comprises a drive shaft 260 journaled between the side walls 230, an input drive sprocket 262 fixed to a shaft end projecting laterally from the hopper, a series of laterally spaced belt driving sprockets 264 fixed to the shaft 260, and a belt wrapping unit 266. The input drive sprocket 262 runs in mesh with a chain driven by the motor 50. The belt driving sprocket teeth project through the belt—engaging the linked wires forming the belt—at several locations proceeding across the width of the breading unit to transmit drive from the motor to the belt. The belt wrapping unit 266 comprises a pair of semicircular belt engaging guides that are spaced laterally apart and immediately below and adjacent the shaft 260. The guides maintain the belt engaged with the drive shaft through about 180° around the shaft centerline and assure that the belt does not "jump" off of the sprockets.

The shafts 254 support the belt 250 so that, when the belt is driven, breading material circulation through the passage 243 and along the travel path 204 are assured. The belt 250 is trained around the supporting shaft 254a so that the belt upper reach extends on the travel path 204 parallel to the core surface 240. The lower reach extends parallel to and between the hopper base 232 and the guide face 242 between the shafts 254a and 254b. The shafts 254 are formed from smooth steel rods so the belt slides freely over them with minimal friction. The shaft 254a is supported by and between the side walls 230 in a fixed position. The shaft 254b is supported by the belt tensioning unit 256 and is movable as a unit.

The belt tensioning unit 256 biases the shaft 254b into engagement with the belt and enables shaft movement to detension the belt. The illustrated unit 256 is formed by a shaft supporting sheet metal plate 256a that is mounted on a pivot shaft 268. The plate 256a has lateral side flanges 256b mounted to the pivot shaft 268 adjacent the drive shaft. The side flanges support the belt support shaft 254b between them remote from the pivot axis defined by the shaft 268. The shaft 254b is illustrated in its normal position in which it is gravity biased to maintain the belt lower reach parallel to the reservoir base 232. In the event the belt tension should increase, for example if something becomes entangled in the belt, the unit 256 and the shaft 254b shift about the axis of the shaft 268 to detension the belt.

The plate 256a channels loose breading that has passed through the application station 206 back into the hopper. The plate 256a is disposed below the travel path 204 at the discharge end of the breading application station. Breading that has not been applied at the station falls from the conveyor back into the hopper 220 and impinges on the plate. Some breading clings to the conveyor belt wires 250 emerging from the application station. Spring leafs 269 are resiliently biased against the belt 250 and repeatedly strike the belt as it moves to dislodge breading from the belt.

In the illustrated machine 10 the conveyor belts operate at substantially identical surface speeds. When the conveyor section 102 is angled downwardly and delivers dimensionally unstable, flaccid food items to the horizontal conveyor belt 250 in the breading unit, the food items are accelerated in the horizontal direction by the belt 250. This change in the food item speed tends to keep items flat—as distinguished from dropping the items in heaps—as they move from one conveyor belt to the other.

In the illustrated breading unit the breading application station 206 is a straight chute, or throat-like passage, along the travel path centerline that is narrower than the breading unit and through which the food items pass. The illustrated station 206 is formed by panel walls 270, 272 that are connected to respective opposite breading unit side walls (See FIG. 5). The panels converge proceeding inwardly from the sidewalls in the direction of belt travel. At the station 206 the panels form respective parallel breading station side walls 274, 276. Each panel defines a lower edge that is disposed just above the belt upper reach. Fluidized breading material flowing along the travel path 204 above the belt 250 impinges on the converging panel wall sections 270, 272, is deflected, and flows along the panel walls toward the station 206. The breading material flow is concentrated as it moves toward the station so the breading material depth increases as the material approaches the station 206 between the panels (See FIGS. 7 and 8). Food items on the conveyor that are not aligned with the travel path centerline are guided through the station by the converging panels.

According to a preferred embodiment of the invention the breading flow control system 208 restricts the passage of breading material through the station 206 without impeding the movement of food items, so that food items passing through the station are inundated by breading material accumulated at the station 206. The system 208 comprises a breading flow restrictor 300 that engages food items at the breading application station for enabling breaded items to pass through the station while restricting the flow of breading material from the station. The preferred flow restrictor 300 comprises a plurality of flow restrictor members 302 respectively supported above the travel path 204 at the station 206. Each restrictor member 302 defines a surface 304 biased toward a first position engaged with, or adjacent, the conveyor. The surfaces 304 are disposed adjacent each other proceeding laterally across the travel path 204. In the preferred embodiment the surfaces 304 are aligned normal to the travel path and collectively extend completely across the station 206 from one station side wall to the other. When each surface is in its first position, the surfaces collectively provide a virtually continuous obstruction to breading material that would otherwise pass through the station 206 above the level of the belt.

The surfaces 304 obstruct the concentrated breading material flow moving along the panel walls 270, 272 to mound the material just upstream from the station 206 and thus create a standing wave of the material. When sufficient material collects in the wave, the restrictor member biasing force is overcome by the pressure of the concentrated fluent breading and the restrictor members 302 lift away from the belt somewhat to permit passage of some breading material through the station 206. The restrictors 302 establish an equilibrium position where the standing wave is maintained and the flow rate of breading moving through the station is determined primarily by the restrictor biasing force, the conveyor speed and the breading material consistency.

When a food item moves into the station, those restrictor member surfaces that engage the item shift away from their first position and move in conformity with the food item profile as it passes the raised restrictor member. The restrictor thus operates to tamp the passing food item without interfering with food item movement. At the same time the restrictor member in question obstructs nearly all but a surface coating of breading material from passing through the station 206 on the food item in line with the restrictor member. Restrictor members that do not engage the food item remain in their first, or equilibrium positions.

In addition to their individual tamping and breading flow restricting functions, the restrictor members collectively act to compress the breading material against the food items at the application station. Because of the fluidic nature of the breading material moving along the conveyor, the restrictor members engaging the breading pressurize it and, in effect, pack the breading against the food item even at locations along the lateral sides of the items where a restrictor member is not tamping the item.

The preferred and illustrated restrictor members 302 are formed by narrow elongated members that are gravity biased toward the belt 250 and define arcuate, lobe-like food item engaging surfaces 304. Because the restrictor members are relatively thin, the restrictor members that engage a food item passing through the station 206 collectively act to conform to the cross sectional shape of the food item portion that they engage at any moment. This blocks any significant amount of breading material from passing through the station that would otherwise be carried away on food items.

In the illustrated machine 10 each restrictor member is pivoted about an axis extending between the panel walls 270, 272. In the illustrated machine, a pivot shaft 310 is detachably carried in respective sidewall notches 312 and extends through a conforming hole in the end 314 of each restrictor member 302 remote from the surface 304. Thus as the restrictor members engage the food items the surfaces 304 ride over the items as the restrictor members pivot about the axis of the shaft 310 at their remote ends. Additional notches 312a, 312b are provided so that the angularity between the restrictor members and the travel path 104 can be adjusted by repositioning the pivot shaft between alternative notches.

The preferred restrictor members are identical, with each being symmetrical about its longitudinal axis 316 so that restrictor members that have been removed from the machine 10 and sanitized may be replaced without regard to their orientation with respect to the shaft. The restrictor members are preferably formed from a suitable plastic, such as nylon.

The breading flow control system 208 of the illustrated machine 10 comprises a breading diverter unit 320 (See FIGS. 5 and 6A) for deflecting breading material on the conveyor approaching the breading application station 206. The unit 320 comprises a breading plow 322 projecting over the breading unit conveyor 202 and into the breading material to direct breading material laterally relative to the travel path, and connector structure detachably securing the plow 322 in adjusted positions relative to the breading unit conveyor. The preferred plow 322 comprises a plate-like rectangular member having a projecting side 326 that extends laterally across the travel path. When the plow side 326 extends into the breading material being moved by the conveyor 202, it diverts some of the breading flow around the opposite plow plate ends 330. The diverted breading forms continuous parallel breading mounds forming opposite lateral sides of a furrow. The mounds move with the conveyor 202 and impinge on the converging wall sections 270, 272. The wall sections 270, 272 build the height of the accumulating breading material moving along them until the breading material breaks like a wave at each side of the breading application station. When a food item is passing the application station the breading material waves break over the item. At substantially the same time the food item passes into and through the standing wave of breading material that has accumulated just upstream from the breading restrictor 300.

The plow position is adjusted to control the height of the breading mounds impinging on the converging panel walls 270, 272. The connector structure fixes the plow side 326 in various desired elevations over the conveyor 202 so that differing amounts of the breading material can be diverted around the sides of the plate. In the preferred embodiment of the invention the plow plate is clamped on adjusted positions and comprises clamping flanges 340, 342 formed on its opposite ends. The flanges extend along the laterally outer sides of the support members 124 and the screws 130 extend through the flanges so that the hand knobs bear against the flanges when tightened. Each flange 340, 342 defines a slot 344 that opens toward the battering unit 14 and extends to an offset bearing slot portion that receives the shank of the screw 130 when the plow is assembled to the conveyor end section 102 (See FIG. 6A). The bearing slot portions enable the plow to pivot about the axis of the screws 130 independently from the conveyor end section 102. When the hand knobs 132 are tightened the plow is fixed in its adjusted position relative to the screw axis. Each slot 344 also defines an enlarged arcuate clearance section that receives the drive shaft 83a to enable the clamping flange to rotate about the screw 130 through a predetermined angular extent without interference with the drive shaft.

Adjusting the height of the plow 322 and the conveyor end section 102 above the belt 250 is dictated by a number of factors. The breading material consistency varies between flour-like powder and relatively coarse cracker crumbs. As the machine 10 operates, the breading material picks up moisture from the batter, changing the breading consistency. The batter itself is widely variable. Further, as the machine operates, the breading supply is gradually reduced, altering the breading flow characteristics. Additionally, as noted previously, the types and kinds of food items being breaded have disparate structures and consistencies. These factors all enter into determining how the plow 322 and end section 102 are positioned.

For instance when relatively large, dimensionally stable food items like chicken breasts, are to be breaded with a breading that has become moist and somewhat depleted, the conveyor end section 102 might be adjusted to project over the breading conveyor so that the chicken breasts drop onto the breading conveyor from the end section 102 impacting the breading. The plow 322 position could be adjusted so that the side 326 extends substantially into the breading flow. This plow position maximizes the height of the breading mounds impinging on the panel walls 270, 272 so that breading is directed onto the top and sides of the breasts as they approach the breading application station. The adjusted plow position is selected so that sufficient breading remains flowing above the belt 250 to assure that breading is deposited on the lower side of the chicken breast when it falls onto the belt.

When flaccid food items are breaded, the end section 102 is usually adjusted to extend downwardly so that the food items are delivered nearly directly onto the belt 250 from the belt 84. As noted, the differential horizontal belt velocity accelerates the food items off the belt 84 so they tend to be straightened, and at least not heaped, by the transfer. Some such food items—like chicken tenders and clams—can stick to the wires forming the belt 84. When this occurs the food item might be carried by the belt 84 between the lower reach and the adjacent plow plate 322 back into the batter reservoir. But in the preferred machine 10 the plow plate 322 may be position adjusted so that the plow plate side 326 is spaced away from the belt 84. This plow position provides the time necessary for food items that have become adhered to the belt wires to drop from the conveyor as the belt 84 rounds the roll 126. The degree of separation between the plow plate and the conveyor end section 102 is enhanced by the fact that the plow plate has a center of rotation (The axis of the screws 130) that is closer to the plate side 326 than the center of rotation of the belt 84(The axis of the shaft 83a). The dislodged food item lands on and slides down the plow plate onto the belt 250.

While a single embodiment of the invention has been illustrated and described in considerable detail, the invention is not to be considered limited to the precise construction disclosed. Various adaptations, modifications, and uses of the invention may occur to those skilled in the business to which the invention relates. The intention is to cover all such adaptations, modifications, and uses coming within the spirit or scope of the appended claims.

Having described my invention I claim:

1. A food product breading machine for coating food products with particulate fluent breading material comprising:

a breading material reservoir, a conveyor for moving food products and breading material along a travel path through the breading material reservoir, and a breading material flow controlling system for producing a standing wave of breading material over the conveyor that is compressed at a breading application station, food products conveyed through said station passing through the standing wave of breading material;

said breading material flow controlling system comprising a breading flow restrictor for engaging a product at the breading application station to enable breaded product to pass through the station while restricting the flow of breading material from said station, said flow restrictor comprising a plurality of flow restrictor members respectively supported above said station with each restrictor member defining a surface biased toward a first position adjacent said conveyor, said member surfaces disposed adjacent each other proceeding laterally across the travel path and, in said first position restricting the passage of breading material through said station to create said standing wave, restrictor member surfaces engaging product on said conveyor passing through said station being shifted away from said first position in conformity with the product to restrict the passage of breading carried by the product through the station.

2. A food product breading machine for coating food products with particulate breading material comprising:

a. a breading unit comprising a breading material reservoir, a conveyor for moving food products and breading material along a travel path through the breading material reservoir, a breading application station defined along said travel path, and a breading material flow controlling system at said breading application station for accumulating breading material at said application station;

b. said breading material flow controlling system comprising a product engaging breading flow restrictor unit establishing a standing wave of breading material at said application station when food products approach said station, said restrictor unit comprising a plurality of food product engaging elements defining respective surfaces movable toward and away from said conveyor that locally compress the breading material into contact with food product at the breading application station and enable breaded product to pass through the standing wave of breading material and the station while continuing to restrict the flow of breading material from said station.

3. The breading machine claimed in claim 2 wherein each food product engaging element is supported above the conveyor and biased toward engagement with food products on said conveyor, said elements disposed in an array extending transversely with respect to the direction of said travel path.

4. The breading machine claimed in claim 2 further comprising mounting structure supporting a portion of each food product engaging element for movement from a rest position adjacent the conveyor when food product is not at said breading station.

5. The breading machine claimed in claim 4 wherein said food product engaging element surfaces are located immediately adjacent each other when adjacent food product engaging elements are in said rest position.

6. The breading machine claimed in claim 5 wherein the lateral dimension of each food product engaging element surface is small compared to the width of said breading station.

7. The breading machine claimed in claim 2 further comprising a food product battering unit associated with said breading unit, said battering unit comprising a batter reservoir and a battering unit conveyor for moving food products through the batter reservoir and delivering food products to said breading unit, said battering unit conveyor comprising a food product delivering end section extending over said breading unit conveyor at a location spaced from said breading application station so that food products moving off the battering unit conveyor end section are delivered to said breading unit conveyor.

8. The breading machine claimed in claim 7 wherein said battering conveyor end section further comprises a conveyor end section support unit and connector structure for detachably securing said support unit in position with respect to said breading unit, said support unit projecting over said breading unit conveyor with its projecting end movable toward and away from the breading unit conveyor between adjusted positions in which said support unit is secured by said connector.

9. The breading machine claimed in claim 8 further including a breading material diverter unit comprising a plate projecting over said breading unit conveyor and into the breading material to direct breading material laterally relative to the travel path, and said connector structure detachably securing said plate in adjusted positions relative to said battering unit conveyor.

10. A food product breading machine for coating food products with particulate breading material comprising:
   a. a breading unit comprising a breading material reservoir, a conveyor for moving food products and breading material along a travel path through the breading material reservoir, a breading application station defined along said travel path, and a breading material flow controlling system at said breading application station for accumulating breading material at said application station;
   b. said breading material flow controlling system comprising a product engaging breading flow restrictor unit at said application station and a breading diverter unit for deflecting breading material on the conveyor approaching the breading application station, said diverter unit comprising a breading plow projecting over the breading unit conveyor and into the breading material and connector structure for detachably securing the plow in adjusted positions relative to the breading unit conveyor, said plow effective to direct breading material laterally relative to the travel path and creating a furrow bounded by breading mounds that facilitate application of breading to food products at the application station, said connector structure adjusted to vary the size of the breading mounds.

11. The food product breading machine claimed in claim 10 wherein said breading plow comprises a plate-like member having a projecting side that extends laterally across the travel path and said connector structure supports said plow for pivotal motion remote from said projecting side.

12. A breading machine for breading battered food products comprising:
   a breading unit comprising a breading material reservoir, a first conveyor for moving food products along a travel path through the breading material reservoir, said breading conveyor constructed for moving through the particulate breading material to move said material along said travel path, a breading application station defined along said travel path, a breading material flow controlling system at said breading application station for restricting breading material movement at said application station to inundate food products approaching said station with breading material, and a second conveyor for delivering battered food products to said reservoir;
   said second conveyor comprising an endless conveyor member having a reach defining an end portion projecting over said reservoir said reach end portion comprising an upper belt section for supporting product being delivered to said reservoir and a lower, return section, a reach end support unit and a positioner member for adjustably fixing the position of said reach end supporting unit and reach end portion relative to said first conveyor, said second conveyor reach end positioned adjacent said first conveyor for delivering flaccid elongated products to said first conveyor.

13. The machine claimed in claim 12 wherein said breading material flow controlling system comprises opposite lateral reservoir walls extending above said conveyor and converging proceeding toward said breading application station.

14. The machine claimed in claim 13 further comprising a breading material flow deflector upstream from the breading application station, said flow defector disposed above said conveyor and effective to divert breading material from a central section of said conveyor to opposite lateral sides of the conveyor.

* * * * *